US012689969B2

(12) United States Patent
Smith et al.

(10) Patent No.: US 12,689,969 B2
(45) Date of Patent: Jul. 21, 2026

(54) TRANSPORT MECHANISM SELECTION FOR MULTI-ACCESS POINT COORDINATION GROUP (CG)

(71) Applicant: Cisco Technology, Inc., San Jose, CA (US)

(72) Inventors: Malcolm M. Smith, Richardson, TX (US); Indermeet S. Gandhi, San Jose, CA (US); Brian D. Hart, Sunnyvale, CA (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 18/943,641

(22) Filed: Nov. 11, 2024

(65) Prior Publication Data

US 2025/0203487 A1      Jun. 19, 2025

Related U.S. Application Data

(60) Provisional application No. 63/612,295, filed on Dec. 19, 2023.

(51) Int. Cl.
| | |
|---|---|
| *H04W 40/24* | (2009.01) |
| *H04L 43/0829* | (2022.01) |

(Continued)

(52) U.S. Cl.
CPC ......... *H04W 40/24* (2013.01); *H04L 43/0829* (2013.01); *H04L 43/0852* (2013.01); *H04L 45/20* (2013.01); *H04W 84/20* (2013.01)

(58) Field of Classification Search
CPC ... H04W 40/24; H04W 84/20; H04W 40/246; H04W 84/12; H04L 43/0829; H04L 43/0852; H04L 45/20; H04L 45/121
See application file for complete search history.

(56) References Cited

U.S. PATENT DOCUMENTS

| | | | |
|---|---|---|---|
| 11,895,014 B2 * | 2/2024 | Dong | H04L 45/24 |
| 2019/0132762 A1 * | 5/2019 | Zhu | H04B 7/024 |

(Continued)

FOREIGN PATENT DOCUMENTS

| | | |
|---|---|---|
| WO | 2007103837 A1 | 9/2007 |
| WO | 2023092493 A1 | 6/2023 |

OTHER PUBLICATIONS

International Search Report and Written Opinion for International Application No. PCT/US2024/061171, mailed Apr. 3, 2025, 17 Pages.

*Primary Examiner* — Michael Won
(74) *Attorney, Agent, or Firm* — Patterson + Sheridan, LLP

(57) ABSTRACT

The present disclosure provides techniques for transport mode selection based on MAPC deployment. A network device receives information from one or more other network devices within a CG, where the CG is configured to operate using a MAPC mode, and the information indicates a support of acting as a transport node over wired connections and a MAPC transport role within the CG for each of the other network devices. The network device estimates a wired path between the network device and at least one of the other network device, and determines transit times required for communication over the wired paths and transit times required for communication over wireless paths. Considering the transit times for the wired and wireless paths and the MAPC mode, the network device selects a transport mode, communicates the transport mode to the other network devices, and performs a network coordination operation using the transport mode.

20 Claims, 10 Drawing Sheets

(51) Int. Cl.
    *H04L 43/0852*      (2022.01)
    *H04L 45/00*        (2022.01)
    *H04W 84/20*      (2009.01)

(56)          References Cited

U.S. PATENT DOCUMENTS

| | | |
|---|---|---|
| 2021/0120454 A1 | 4/2021 | Chennichetty et al. |
| 2023/0319886 A1 | 10/2023 | Wang et al. |
| 2023/0328622 A1 | 10/2023 | Park et al. |
| 2023/0388920 A1 | 11/2023 | Solaija et al. |
| 2024/0049057 A1* | 2/2024 | Smith ............... H04W 28/0278 |
| 2024/0129227 A1* | 4/2024 | Dong ..................... H04L 45/02 |
| 2024/0179687 A1* | 5/2024 | Smith ............... H04W 72/0446 |
| 2024/0236784 A1* | 7/2024 | Henry .................. H04W 36/30 |
| 2024/0413883 A1 | 12/2024 | Zhou et al. |
| 2025/0119819 A1* | 4/2025 | Zuniga ................. H04W 24/02 |
| 2025/0193914 A1* | 6/2025 | Gandhi .............. H04W 72/535 |

* cited by examiner

500

INITIALIZE SETTING(S) — 505

RECEIVE TRANSPORT CAPABILITY INFORMATION FROM PEER APS — 510

IS ALL CAPABILITY INFORMATION RECEIVED? — 515

NO

YES

ESTIMATE WIRED PATH(S) AND TRANSMISSION TIME — 520

ESTIMATE WIRELESS PATH(S) AND TRANSMISSION TIME — 525

EVALUATE MAPC MODE — 530

SELECT TRANSPORT MODE — 535

COMMUNICATE TRANSPORT MODE TO PEER APS — 540

PERFORM CENTRALIZED MULTI-AP COORDINATION — 545

600

INITIALIZE SETTING(S) — 605

BROADCAST TRANSPORT CAPABILITY INFORMATION TO PEER APS — 610

RECEIVE TRANSPORT CAPABILITY INFORMATION FROM PEER APS — 615

IS ALL CAPABILITY INFORMATION RECEIVED? — 620

NO

YES

ESTIMATE WIRED PATH(S) AND TRANSMISSION TIME — 630

ESTIMATE WIRELESS PATH(S) AND TRANSMISSION TIME — 635

REPORT TO COORDINATOR — 640

RECEIVE TRANSPORT MODE — 645

PERFORM MULTI-AP COORDINATION — 650

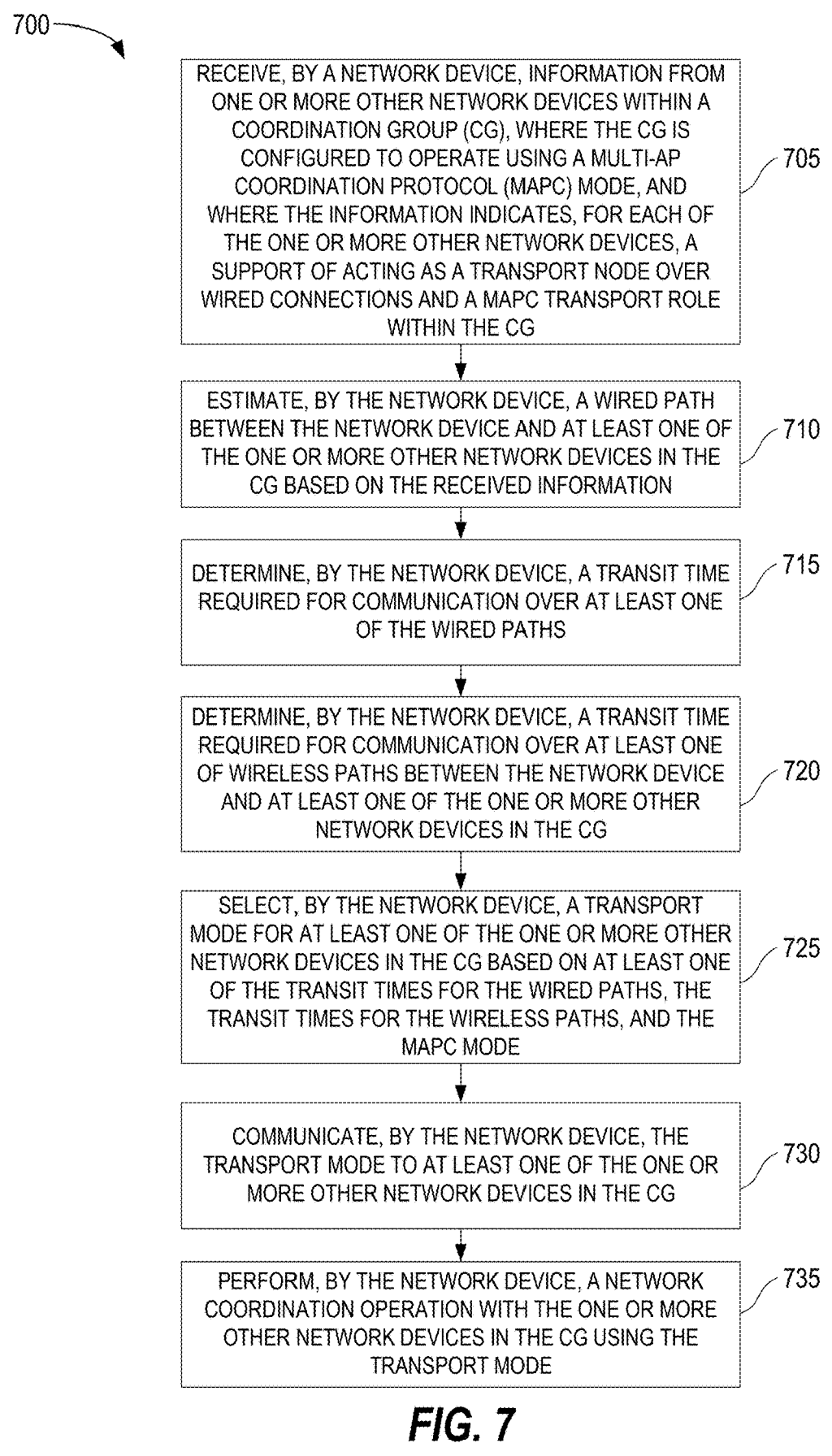

700

RECEIVE, BY A NETWORK DEVICE, INFORMATION FROM ONE OR MORE OTHER NETWORK DEVICES WITHIN A COORDINATION GROUP (CG), WHERE THE CG IS CONFIGURED TO OPERATE USING A MULTI-AP COORDINATION PROTOCOL (MAPC) MODE, AND WHERE THE INFORMATION INDICATES, FOR EACH OF THE ONE OR MORE OTHER NETWORK DEVICES, A SUPPORT OF ACTING AS A TRANSPORT NODE OVER WIRED CONNECTIONS AND A MAPC TRANSPORT ROLE WITHIN THE CG — 705

ESTIMATE, BY THE NETWORK DEVICE, A WIRED PATH BETWEEN THE NETWORK DEVICE AND AT LEAST ONE OF THE ONE OR MORE OTHER NETWORK DEVICES IN THE CG BASED ON THE RECEIVED INFORMATION — 710

DETERMINE, BY THE NETWORK DEVICE, A TRANSIT TIME REQUIRED FOR COMMUNICATION OVER AT LEAST ONE OF THE WIRED PATHS — 715

DETERMINE, BY THE NETWORK DEVICE, A TRANSIT TIME REQUIRED FOR COMMUNICATION OVER AT LEAST ONE OF WIRELESS PATHS BETWEEN THE NETWORK DEVICE AND AT LEAST ONE OF THE ONE OR MORE OTHER NETWORK DEVICES IN THE CG — 720

SELECT, BY THE NETWORK DEVICE, A TRANSPORT MODE FOR AT LEAST ONE OF THE ONE OR MORE OTHER NETWORK DEVICES IN THE CG BASED ON AT LEAST ONE OF THE TRANSIT TIMES FOR THE WIRED PATHS, THE TRANSIT TIMES FOR THE WIRELESS PATHS, AND THE MAPC MODE — 725

COMMUNICATE, BY THE NETWORK DEVICE, THE TRANSPORT MODE TO AT LEAST ONE OF THE ONE OR MORE OTHER NETWORK DEVICES IN THE CG — 730

PERFORM, BY THE NETWORK DEVICE, A NETWORK COORDINATION OPERATION WITH THE ONE OR MORE OTHER NETWORK DEVICES IN THE CG USING THE TRANSPORT MODE — 735

*FIG. 7*

TRANSPORT MECHANISM SELECTION FOR MULTI-ACCESS POINT COORDINATION GROUP (CG)

CROSS-REFERENCE TO RELATED APPLICATIONS

This application claims benefit of co-pending U.S. provisional patent application Ser. No. 63/612,295 filed Dec. 19, 2023. The aforementioned related patent application is herein incorporated by reference in its entirety.

TECHNICAL FIELD

Embodiments presented in this disclosure generally relate to wireless communication. More specifically, embodiments disclosed herein relate to selecting a transport mechanism for a coordination group (CG) based on deployed Multi-Access Point Coordination (MAPC) mode and estimated path characteristics.

BACKGROUND

The emerging Wi-Fi 8 standard focus primarily on inter-Basic Service Set (inter-BSS) Over-the-Air (OTA) communication for MAPC. However, it does not address the potential for network infrastructures to facilitate MAPC coordination through traditional connections, such as Access Point (AP)-to-AP Ethernet/WiFi links, AP-Wireless Local Area Network Controller (WLC)-AP Ethernet/IP communications, or even Root Access Point (RAP)-Mesh Access Point (MAP) mesh networks (not including peer-to-peer setups). In these configurations, APs can transmit discovery and coordination messages for MAPC across the network, using either wired or wireless paths to improve overall coordination efficiency. Despite these possibilities, the choice between these transport options, whether to use wired or wireless paths for multi-AP coordination, and the rationale for such decisions have not been defined by existing standards.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 7 is a flow diagram depicting an example method for transport mode selection based on MAPC deployment modes, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1B:
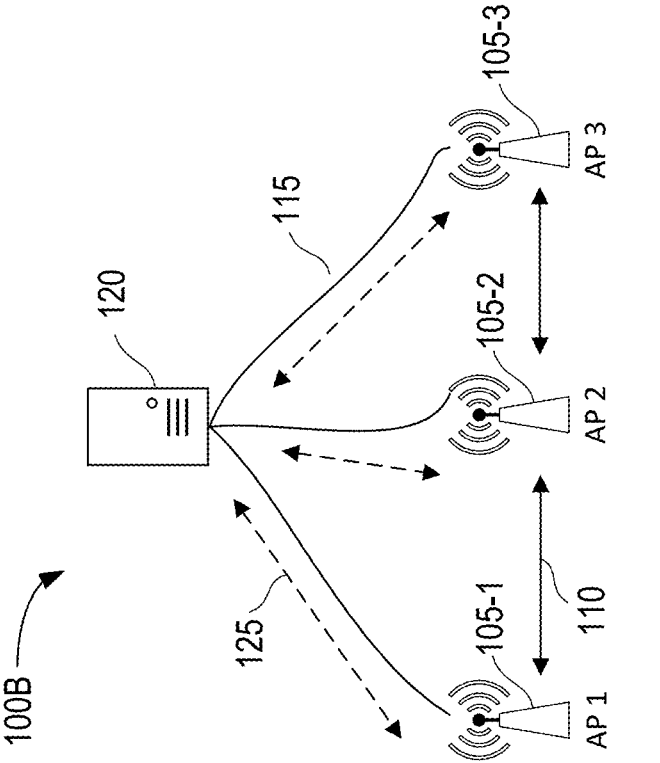
FIGS. 1A-1C depict example network architectures for multi-AP coordination, according to some embodiments of the present disclosure.

One embodiment presented in this disclosure provides a method, including receiving, by a network device, information from one or more other network devices within a coordination group (CG), where the CG is configured to operate using a Multi-AP Coordination Protocol (MAPC) mode and the information indicates, for each of the one or more other network devices, a support of acting as a transport node over wired connections and a MAPC transport role within the CG, estimating, by the network device, a wired path between the network device and at least one of the one or more other network devices in the CG based on the received information, determining, by the network device, a transit time required for communication over at least one of the wired paths, determining, by the network device, a transit time required for communication over at least one of wireless paths between the network device and at least one of the one or more other network devices in the CG, selecting, by the network device, a transport mode for at least one of the one or more other network devices in the CG based on at least one of the transit times for the wired paths, the transit times for the wireless paths, and the MAPC mode, communicating, by the network device, the transport mode to at least one of the one or more other network devices in the CG, and performing, by the network device, a network coordination operation with the one or more other network devices in the CG using the transport mode.

Other embodiments in this disclosure provide one or more non-transitory computer-readable media containing, in any combination, computer program code that, when executed by operation of a computer system, performs an operation in accordance with one or more of the above methods, as well as a system of a network device comprising one or more memories collectively containing one or more programs, one or more computer processors, where the one or more processors are configured to, individually or collectively, perform an operation in accordance with one or more of the above methods.

Example Embodiments

Messages for MAPC may be transmitted either wired or wirelessly (or Over-the-Air (OTA)) using various network configurations, including AP-to-AP Ethernet/WiFi links, AP-WLC-AP Ethernet/IP communications, or even RAP-MAP mesh networks. The Wi-Fi 8 standard and existing frameworks do not fully address this potential or provide clear guidelines for selecting between these transport options. Additionally, different MAPC modes may have different transport needs, which further complicates the selection of an appropriate transport mode for multi-AP coordination. For example, Coordinated Time-Division Multiple Access (C-TDMA) mode prioritizes group reliability over speed, as the Transmission Opportunity (TXOP) is scheduled in the future, and if all APs in the CG do not comply (e.g., do not receive the message), the TXOP is wasted or corrupted. In contrast, Coordinated Spatial Reuse (C-SR) mode requires group distribution speed rather than high reliability since coordination happens over one or a few TXOPs, primarily for best-effort service among a large number of potential APs. Under the C-SR mode, if a message is lost, the MAPC coordination can still succeed, albeit with fewer participating APs.

The present disclosure introduces techniques for selecting the appropriate transport mechanism for a CG based on the MAPC mode in use (e.g., C-TDMA, C-SR, or other modes) and the evaluated transmission characteristics for wired or wireless paths. More specifically, the disclosure provides methods for APs in the CG to broadcast their transport capability information to other devices within the group. In some embodiments, the transport capability information may include an indication of the AP's ability to act as a transport node in wired communication, as well as its role within the network (e.g., relay or endpoint). In embodiments where there is a leader AP (or a WLC) within the CG, the MAPC coordination may be centralized, involving 1-to-N communications between the leader AP (or a WLC) and the participating APs within the CG. In this configuration, the leader AP (or WLC) may collect the broadcasted information from each participating AP, and estimate the paths and transit times from itself to each of these participating APs. The estimation process may consider both wired and wireless paths, along with the specific requirements of the MAPC mode currently in use, such as C-TDMA or C-SR. By evaluating these factors, the leader AP (or WLC) may make an informed decision on whether to use wired or wireless transport for multi-AP coordination across the CG. The selected transport mode may align with the performance and reliability needs indicated by the deployed MAPC mode (e.g., C-TDMA, C-SR, or other modes).

In embodiments where there is no leader AP within the CG, the MAPC coordination may be decentralized, involving N-to-N communications between the APs. In the decentralized setup, each participating AP within the CG may independently estimate the paths and transit times between itself and the other APs. These estimates may then be collectively analyzed (e.g., by a designated AP for transport mode selection) to determine the proper transport mode for the entire CG, taking into account the MAPC mode (e.g., C-TDMA, C-SR, or other modes) under which the CG is operating and the mode's specific requirements for reliability, speed, and flexibility.

Figure 1A:
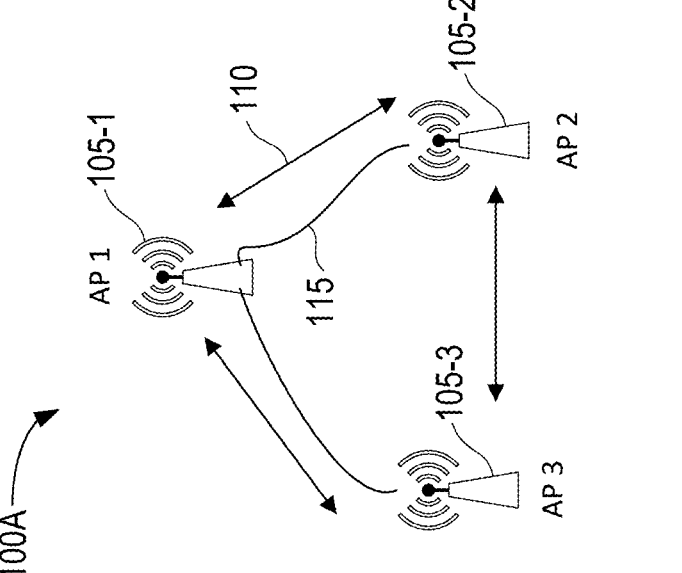
Figure 1C:
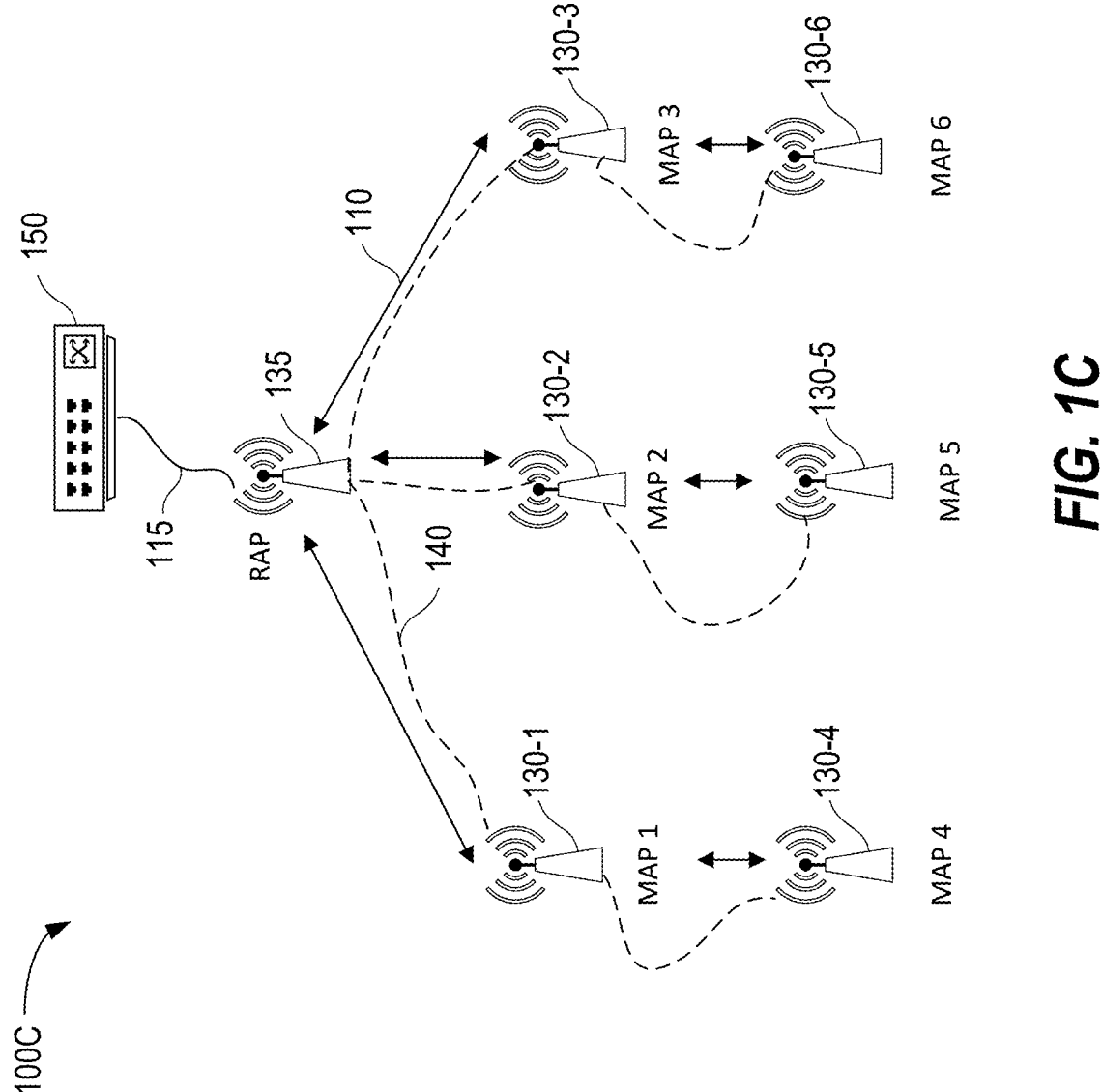

FIGS. 1A-1C depict example network architectures for multi-AP coordination, according to some embodiments of the present disclosure.

FIG. 1A depicts a network setup 100A with AP-to-AP Ethernet/WiFi connections. This figure illustrates how APs communicate through both wired and wireless connections. In some embodiments, the wireless connections may also be referred to as OTA connections. Three APs are depicted, including AP 1 (105-1), AP 2 (105-2), and AP 3 (105-3). In some embodiments, each AP may connect to one or more stations (STAs) and form a Basic Service Set (BSS). In some embodiments, the three APs may collectively form a CG for multi-AP coordination.

As depicted, the three APs 105 are connected through Ethernet cables 115, which form a wired backbone for communication within the CG. In addition to these Ethernet connections 115, wireless links 110 are also established between the APs 105. Through the setups, either wired or wireless paths (e.g., 115 or 110), or both, may be utilized, providing flexibility in MAPC communication.

In some embodiments, MAPC messages, such as discovery or coordination messages, may be transmitted through the Ethernet cables 115 or the wireless links 110, depending on the network conditions and the specific requirements of the MAPC mode in operation. For example, when low-latency and high-reliability communication is required, such as in C-TDMA mode, the wired Ethernet paths 115 may be preferred for transmitting coordination messages to ensure that all APs 105 (including AP 1 (105-1), AP 2 (105-2), and AP 3 (105-3)) receive the information synchronously. Conversely, in embodiments where flexibility and rapid deployment are prioritized, such as in C-SR mode, wireless links 110 may be used to quickly distribute MAPC messages across the APs.

Additionally, in some embodiments, the selection between wired or wireless transport modes may also need to consider the conditions of the path. For example, in C-TDMA mode, wired mode may be selected if the Ethernet cables 115 are in good condition, the APs 105 along the paths are capable of handling the required relay with minimal (or at least reduced) delay, and the overall transit time is within acceptable limits to ensure synchronized communication across the CG. If any of these conditions are not satisfied, the system may switch to a wireless mode to maintain the required coordination. When the CG is operating under C-SR mode, wireless mode may be preferred as wireless links 110 can offer greater flexibility and adaptability. However, if the wireless paths experience high congestion or reduced signal strength, which negatively affect communication performance, the system may switch to wired mode, utilizing wired connections 115 to maintain efficient MAPC communication.

FIG. 1B depicts a network setup 100B with AP-WLC-AP Ethernet/WiFi connections. This figure shows how APs 105 connect to a WLC 120 and each other using both wired and wireless connections.

Three APs are depicted, including AP 1 (105-1), AP 2 (105-2), and AP 3 (105-3). Three APs are connected to a Wireless Local Area Network (LAN) Controller (WLC) 120 via Ethernet cables 115. In some embodiments, each AP 105 may connect to one or more STAs and form a BSS, and three APs 105 may collectively operate within a CG for multi-AP coordination. In the example network setup 100B, the wired connection 115 may be used to transmit MAPC messages (e.g., discovery or coordination messages) between the WLC 120 and APs 105. When the wired connections 115 are disrupted or the WLC 120 is not enabled, the wireless connections 110 between the APs 105 may provide an alternative communication path for MAPC. These wireless links 110 allow the network to continue functioning and maintain coordination even in the absence of a direct wired connection.

In embodiments where the WLC 120 is also wirelessly connected to the APs 105 (as depicted in dashed lines 125), both wired and wireless communication may support multi-AP coordination. In this configuration, the selection of the communication path (e.g., wireless or wired) may require the consideration of the MAPC mode in operation. For example, when C-TDMA mode is in use, which requires precise timing and high reliability, the wired Ethernet paths

115 may be favored to ensure all APs 105 receive the coordination messages synchronously. When C-SR mode is in use, which prioritizes speed and flexibility over reliability, the wireless links 125 between WLC 120 and APs 105 may be selected if these links offer better performance under the current network conditions.

FIG. 1C depicts a hierarchical mesh network setup 100C, where a root access point (RAP) 135 connects wirelessly to several mesh access points (MAPs) 130 located at different levels within the network. The RAP 135 serves as the primary gateway to the network, and connects to the network backbone, like the switch 150, through an Ethernet cable 115. The MAPs 130, arranged in a hierarchical structure, communicate with the RAP 135 and each other wirelessly and form a multi-tiered mesh network. Among the MAPs, MAP 1 (130-1), MAP 2 (130-2), and MAP 3 (130-3) are located in the first tier, directly connected to the RAP 135, while MAP 4 (130-4), MAP 5 (130-5), and MAP 6 (130-6) are located in the second tier, connecting to their respective MAPs in the first tier. In this configuration, MAPC messages, such as discovery or coordination messages, may be transmitted through the wireless links 110 between the RAP 135 and the MAPs 130 to form a CG and/or perform coordination.

Due to the multi-tiered mesh structure, the transmission of MAPC messages follows a hierarchical relay pattern. For example, when the RAP 135 needs to send a coordination message to a MAP 130 in the second tier, such as MAP 4 (130-4), the message may be first transmitted wirelessly to a MAP in the first tier, such as MAP 1 (130-1). MAP 1 (130-1) may then relay the message to MAP 4 (130-4). Such a relay mechanism ensures that MAPC messages are effectively propagated through the network, reaching all necessary tiers and maintaining coordination and synchronization throughout the entire mesh network.

In the depicted mesh network, the MAPs 130 are wirelessly connected to the RAP 135. Therefore, only wireless paths may be used for transmitting MAPC messages. However, in embodiments where MAPs 130 in different tiers are also connected to the RAP through cables 140 (as depicted in dashed lines), MAPC messages may also be relayed through wired connections. For example, MAP 4 (130-4) in the second tier may connect to MAP 1 (130-1) in the first tier through one cable, and MAP 1 (130-1) may then connect to RAP 135 through another cable. A message from RAP 135 to MAP 4 (130-4) may be forwarded by MAP 1 (130-1) over the two wired cables 140. In this configuration, both wired and wireless connections (e.g., 140 and 110) may be used for transmitting MAPC messages, and the selection of the path or transport mode (wired or wireless) may consider the specific requirements of the MAPC mode in use within the CG. For example, if C-TDMA mode is in use, wired paths 140 may be favored for their high reliability and low latency. Alternatively, if C-SR mode is in use, wireless paths 110 may be preferred for their flexibility and speed in dynamic network environments.

More details about the calculation of transit times for wired and wireless paths within the CG, as well as the selection of transport mechanisms (wired or wireless), are discussed below with references to FIGS. 2-4.

Figure 2:
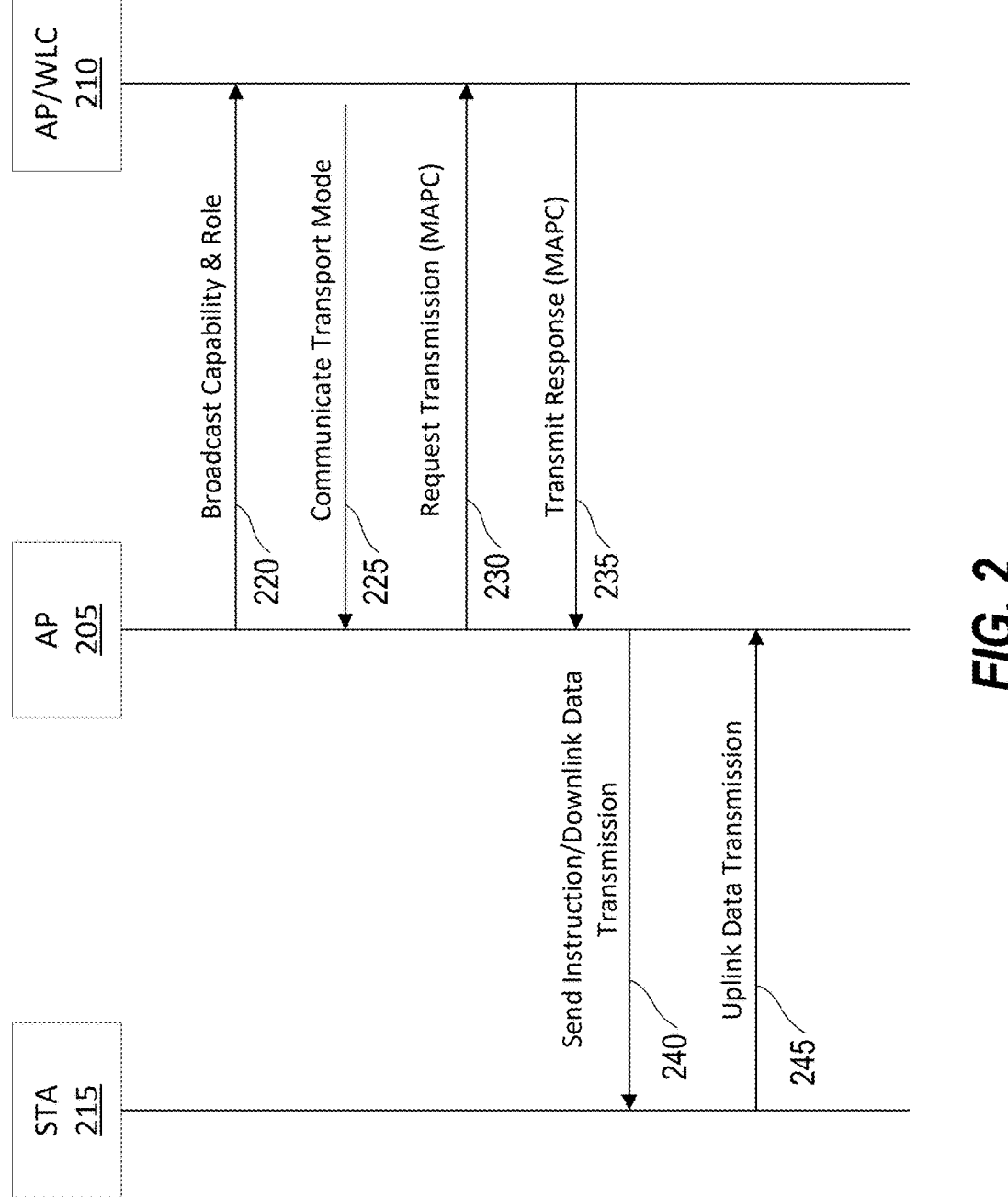
FIG. 2 is a flowchart depicting communications between APs and STAs for transport mode selection and multi-AP coordination, according to some embodiments of the present disclosure.

FIG. 2 is a flowchart 200 depicting communications between APs (e.g., 205 or 210) and STAs (e.g., 215) for transport mode selection and multi-AP coordination, according to some embodiments of the present disclosure.

In some embodiments, the AP 205 may correspond to a participating AP (also referred to in some embodiments as a peer AP) in a formed CG or a potential CG (not yet fully formed but exchanging discovery messages). The participating AP may be configured to send requests to the leader AP or WLC for coordination of data transmission using shared channels. In some embodiments, the AP 205 may correspond to APs 105-2 and 105-3 as depicted in FIG. 1A, APs 105-1, 105-2, and 105-3 as depicted in FIG. 1B, or MAPs 130 as depicted in FIG. 1C.

In some embodiments, the AP/WLC 210 may correspond to a leader AP or WLC in a formed CG or a potential CG (not yet fully formed but exchanging discovery messages). The leader AP or WLC may be configured to aggregate the information from participating APs, make decisions on the MAPC mode (e.g., C-TDMA, C-SR, or other modes) and/or transport mode (wired or wireless), and provide instructions for data transmission to ensure synchronized communication within the CG. In some embodiments, the AP 205 may correspond to AP 105-1 as depicted in FIG. 1A, WLC 120 as depicted in FIG. 1B, or RAP 135 as depicted in FIG. 1C.

In a decentralized setup where there is no leader AP or WLC, the AP/WLC 210 may correspond to another participating AP, which communicates directly with AP 205 to coordinate MAPC activities.

As depicted, AP 205 broadcasts its transport capability information to AP/WLC 210 (step 220). In some embodiments, the transport capability information may include an indication of the AP's 205 ability to act as a transport node in wired communication. As used herein, the capability of being a transport node in wired communication may refer to the ability to transmit MAPC signals through wired cables. In some embodiments, the capability information may also include details about the potential roles or locations of the device 205, such as whether it is an endpoint in the network topology or a relay point connecting two APs via a wired connection.

In some embodiments, the capability information may be included and sent through a beacon or probe response. In some embodiments, the broadcasting may occur during the initial discovery phase, where APs are negotiating and forming the CG. In some embodiments, the broadcasting may be conducted after the CG has been established, where AP 205 confirms its roles and capabilities within the network.

In some embodiments, AP/WLC 210, upon receiving the capability information from AP 205 and other APs in the CG (or potential CG), may proceed to estimate the paths for wired connections based on the information received. In a centralized MAPC configuration, the AP/WLC 210 may correspond to a leader AP or WLC (e.g., AP 105-1 of FIG. 1A, WLC 120 of FIG. 1B, or RAP 135 of FIG. 1C). The AP/WLC 210 may estimate the paths from itself to each of the participating APs (1×N). More details about the path estimation (1×N) are discussed below with reference to FIG. 3. In a decentralized MAPC configuration, where no single leader AP is present, the AP/WLC 210 may correspond to another participating AP in the CG (e.g., AP 105-2 or 105-3 of FIG. 1A, AP 105 of FIG. 1B, or MAP 130 of FIG. 1C). AP 205, AP 210, and other participating APs in the CG may estimate paths from each AP to every other AP (N×N). More details about the path estimation (N×N) are discussed below with references to FIGS. 4A-4C.

Once the paths are estimated, in some embodiments, AP/WLC 210 may calculate the transit time for each wired connection. As used herein, the transit time for a wired path may include the time for a signal to travel over cables between APs and the time that the signal is processed at the destination AP for conducting multi-AP coordination.

In some embodiments, the calculation of the transit time may consider the termination-delays and the hop-delays. As used herein, the termination-delay may refer to the time delay encountered at the termination point of the path and, more specifically, the time taken for the MAPC message to reach the MAPC process on the destination AP (or WLC). As used herein, the hop-delay may refer to the time delay at each relay point along the wired path, where the signal is transferred from one AP to another. The termination-delays and hop-delays may be summed to determine the total transit time for the wired path. For example, if the formed CG includes RAP 135 and MAPs 130 as depicted in FIG. 1C, AP/WLC 210 corresponds to the RAP 135, and AP 305 corresponds to MAP 4 (130-4). In this setup, a message sent by RAP 135 to MAP 4 (130-4) needs to be relayed by MAP 1 (130-1). The transit time for this message (e.g., sent over the cables 140 between RAP 135 and MAP 4 (130-4)) may include the hop-delay at MAP 1 (130-1) and the termination-delay at MAP 4 (130-4). The RAP 135 may estimate the transit time for messages sent from itself to every MAP in the CG over the wired connections.

In some embodiments, following the calculation of transit times for wired paths, the AP/WLC 210 may proceed to evaluate wireless paths between APs. The AP/WLC 210 may consider metrics reflecting the network conditions, such as wireless signal strength, traffic load, and interference levels, to determine the transit times that may be incurred using wireless links (e.g., 140 of FIG. 1C) for MAPC message transmission. In the example from FIG. 1C, this may include determining the transit times for messages sent over the air from RAP 135 to every MAP 130 in the CG.

In some embodiments, the AP/WLC 210 may then evaluate the current MAPC model along with various factors to select the most suitable transport mode (or the transport mode that offers an improved performance for MAPC). These factors may include transit time, packet loss rate, and other metrics reflecting the conditions of both wired and wireless paths. For example, when the CG is operating under the C-TDMA mode, wired mode may be selected to ensure precise timing and synchronized communication. However, wireless mode may be chosen under the C-TDMA mode in embodiments where wired connections cannot reach every AP, such as when cables only exist between the RAP (e.g., 135 of FIG. 1C) and first-tier MAPs (e.g., MAP 1 (130-1), MAP 2 (130-2), or MAP 3 (130-3) of FIG. 1C). Even when the desired path reaches every AP, such as when cables exist both between the RAP (e.g., 135 of FIG. 1C) and first-tier MAPs (e.g., MAP 1 (130-1), MAP 2 (130-2), or MAP 3 (130-3) of FIG. 1C), and between first-tier MAPs and second-tier MAPs (e.g., MAP 4 (130-4), MAP 5 (130-5), or MAP 6 (130-6) of FIG. 1C), wireless mode may still be selected if the calculation results reveal a significant hop-delay at a relay point (e.g., MAP 1 (130-1) of FIG. 1C). This is because the significant hop-delay may cause the transit time between RAP (e.g., 135 of FIG. 1C) and a second-tier MAP (requiring a relay at a first-tier MAP) (e.g., MAP 4 (130-4) of FIG. 1C) much longer than that between RAP and a first-tier MAP (e.g., MAP 2 (130-2)), rendering wired transmission no longer suitable for the C-TDMA mode (which requires high reliability and synchronization across all APs in the same CG).

Alternatively, if C-SR mode is in use, which prioritizes speed and flexibility over reliability, wireless mode may be preferred for its ability to quickly adapt to changing network conditions (even when the estimates show a slight increase in latency compared to wired connections). However, the system may switch to wired mode if it detects that the wireless network is experiencing congestion, high interference levels, or reduced signal strength, making wireless transmission no longer reliable.

Upon determining the transport mode (wired or wireless), as depicted, AP/WLC 210 communicates the determined mode back to AP 205 (step 225). The communication instructs AP 205 to follow the determined transport mechanism for sending and receiving MAPC coordination messages. In some embodiments, the message conveying the selected transport mode may be transmitted using specific management frames, such as a beacon or probe response.

As depicted, AP 205 sends a transmission request to AP/WLC 210 using the determined transport mode (step 230). In some embodiments, the request may include information such as AP's 205 need to transmit data using a shared channel, along with details about the type of data transmission (e.g., uplink or downlink data), the desired timing, priority (e.g., best-effort, voice, and video), and any other relevant parameters. Upon receiving the transmission request, AP/WLC 210 evaluates the request based on the current network conditions and MACP mode. AP/WLC 210 then sends back a response to AP 205 using the determined transport mode (step 235). In some embodiments, the response may include the instructions for proceeding with the data transmission. More specifically, the response may detail the timing, channel access parameters, and any specific protocols to follow. In embodiments where the instruction from AP/WLC 210 is for a downlink transmission, AP 205 may directly follow the instruction and send the downlink data to its associated STA 215 (step 240). The data may be transmitted according to the parameters set by AP/WLC 210 and align with the synchronized communication strategy within the CG. In embodiments where the instruction from AP/WLC 210 is for an uplink transmission, AP 205 may forward the instruction to the STA 215 (step 240). The STA 215 may then follow the instruction and send the uplink data to AP 205 (step 245).

Figure 3:
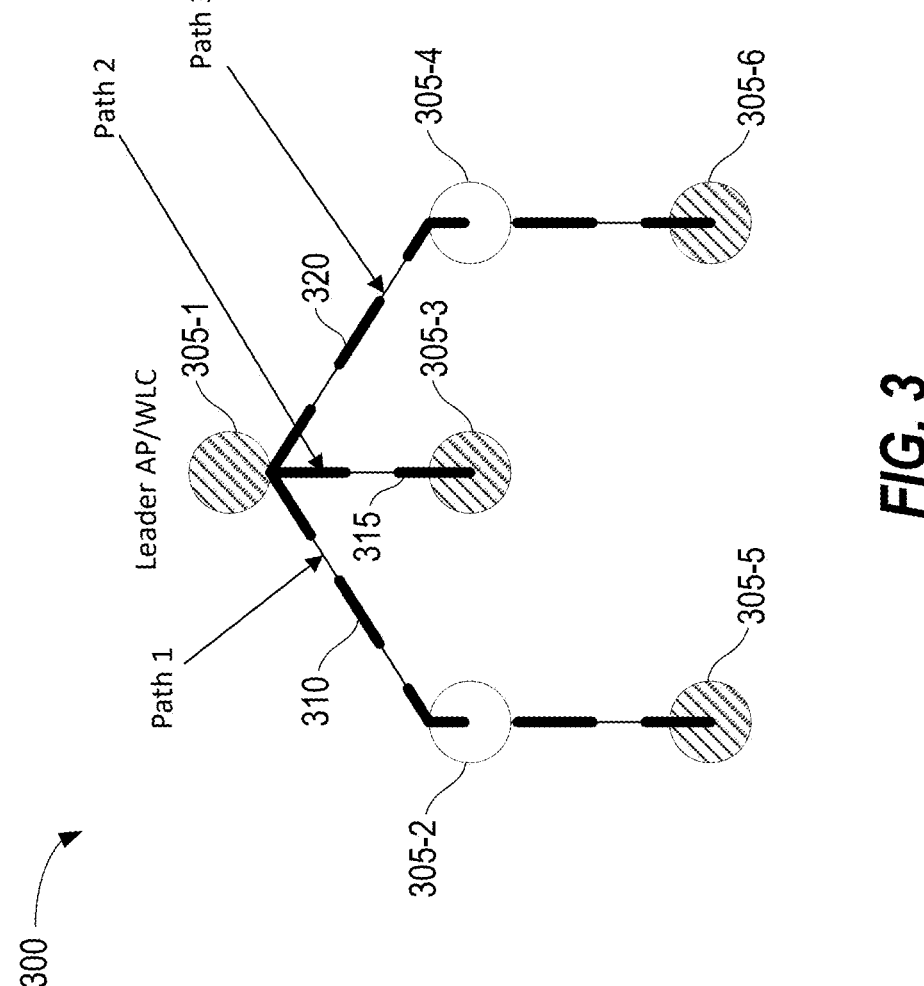
FIG. 3 depicts a wired path configuration where a CG has a leader AP, according to some embodiments of the present disclosure.

FIG. 3 depicts a wired path configuration 300 where a CG has a leader AP CG, according to some embodiments of the present disclosure. In some embodiments, the leader AP 405-1 may correspond to AP 105-1 as depicted in FIG. 1A, WLC 120 as depicted in FIG. 1B, or RAP 135 as depicted in FIG. 1C.

Six APs are depicted in FIG. 3, including AP 305-1, AP 305-2, AP 305-3, AP 305-4, AP 305-5, and AP 305-6. AP 305-1 directly connects to AP 305-2, AP 305-3, and AP 305-4 through wired cables (e.g., Ethernet cables). Additionally, AP 305-2 is wired to AP 305-5, and AP 305-4 is wired to AP 305-6. Since the AP 305-1 is acting as the leader AP, a total of (1×N) wired paths may be estimated for exchanging MAPC messages (e.g., discovery, negotiation, or coordination messages), where "1" represents the leader AP, and "N" represents the number of participating APs. As depicted, when AP 305-1, AP 305-3, AP 305-5, and AP 305-6 form (or intend to form) a CG, three wired paths may be considered: path 1 (310) connecting the leader AP 305-1 to AP 305-5 via AP 305-2, path 2 (315) directly connecting the leader AP 305-1 to AP 305-3, and path 3 (320) connecting the AP 305-1 to AP 305-6 via AP 305-4. Each AP may broadcast its capability of being a transport node and its role to the leader AP 305-1. For example, AP 305-5 may indicate that it is an endpoint node in the network topology, while AP 305-2 may dictate its role as a relay node (forwarding messages between the leader AP 305-1 and AP 305-5).

In some embodiments, the transit time for each wired path within the CG may be calculated by considering both termination-delays and hop-delays along the paths. For path 1 (310), the transit time may include calculating the termination-delay at AP 305-5 (or AP 305-1) and the hop-delay at AP 305-2 (where the signal is relayed). For path 2 (315), the transit time may only include the termination delay at AP 305-3 (or AP 305-1), as there are no intermediate relay points (e.g., no hop-delays). For path 3, the transit time may include calculating the termination-delay at AP 305-6 (or AP 305-1) and the hop-delay at AP 305-4.

The transit times for wired paths may then be used to determine the suitable transport mode within the CG, considering the MAPC mode in use. For example, when C-TDMA mode is used in the CG that consists of AP 305-1, AP 305-3, AP 305-5 and AP 305-6, wired transport mode may be selected since the wired paths (including paths 1, 2 and 3) can reach every participating AP and wired communication has high reliability and low latency. However, the selection may shift to wireless mode if the calculation reveals that the hop-delay is significant, making the transit time for paths 1 and 3 much longer than that for path 2. This discrepancy represents that messages may reach AP 305-3 much earlier than AP 305-5 or AP 305-6. In this configuration, wired mode may not be selected since C-TDMA mode requires synchronized communication across the CG.

In embodiments where C-SR mode is used, wireless transport mode may be preferred for their flexibility and speed. However, if the calculation reveals that transit times for wired paths (including paths 1, 2 and 3) are much shorter than for wireless communications, potentially due to wireless congestion, low signal strength, or high interference levels, the selection may shift to wired mode to ensure the communication remains efficient and reliable within the CG.

Figures 4A, 4B:
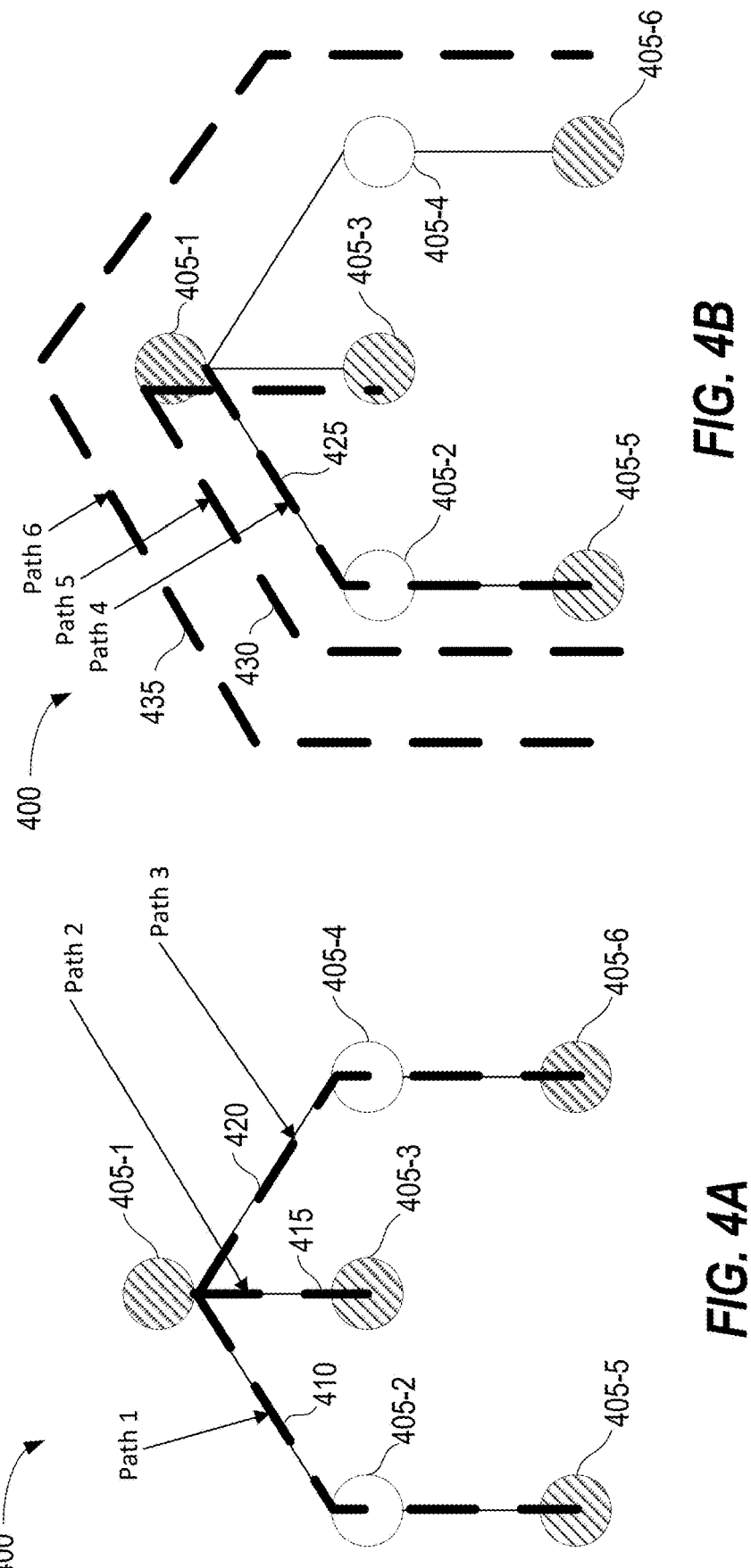
FIGS. 4A-4C show a wired path configuration for a decentralized CG, according to some embodiments of the present disclosure.
Figure 4C:
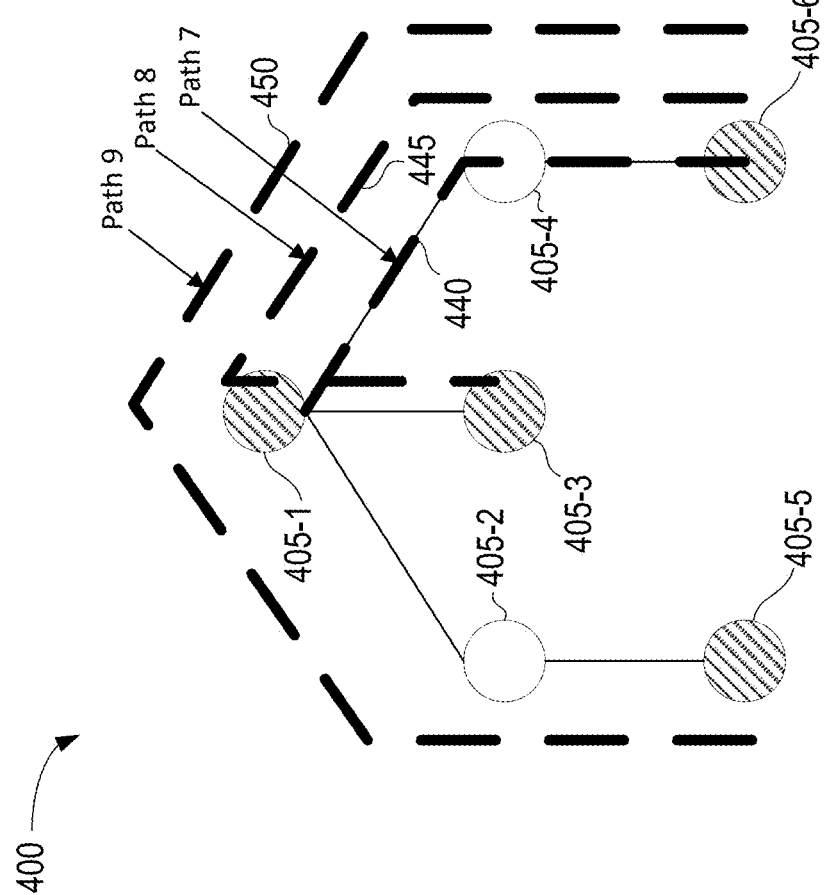

FIGS. 4A-4C show a wired path configuration 400 for a decentralized CG, according to some embodiments of the present disclosure. The network setup in FIGS. 4A-4C is similar to that in FIG. 3, with AP 405-1, AP 405-2, AP 405-3, AP 405-4, AP 405-5, and AP 405-6 connected through wired connections. The only difference is that AP 405-1 is no longer functioning as the leader AP. Instead, the network operates under a decentralized MAPC. In the decentralized setup, each AP sends MAPC messages to other APs in the same CG. The total number of paths in use may be represented by N×N, where N represents the total number of APs in the CG minus 1. As depicted, when the CG includes AP 405-1, AP 405-3, AP 405-5, and AP 405-6, the total wired paths used for MAPC may include nine paths in total.

In the decentralized setup, each AP participates in the path estimation and transit time calculation process. As depicted, each AP may broadcast its capability of being a transport node and its role or locations in the network. For example, AP 405-5 may indicate that it is an endpoint node in the network, while AP 405-2 may dictate its role as a relay node (forwarding messages between the leader AP 405-1 and AP 405-5). When the CG is formed or potentially formed (not yet fully established) between AP 405-1, AP 405-3, AP 405-5, and AP 405-6, AP 405-1 may estimate the following three paths as depicted in FIG. 4A: path 1 (410) connecting the AP 405-1 to AP 405-5 via AP 405-2, path 2 (415) directly connecting the AP 405-1 to AP 405-3, and path 3 (420) connecting the AP 405-1 to AP 405-6 via AP 405-4. The transit time for path 1 (410) may include a termination delay at AP 405-5 (or AP 405-1) and a hop-delay at AP 405-2. The transit time for path 2 (415) may include a termination delay at AP 405-3 (or AP 405-1), with no hop-delays. The transit time for path 3 (420) may include a termination delay at AP 405-6 (or AP 405-1) and a hop-delay at AP 405-4.

Within the CG, AP 405-5 may estimate the following three paths as depicted in FIG. 4B: path 4 (425) connecting the AP 405-5 to AP 405-1 via AP 405-2, path 5 (430) connecting the AP 405-5 to AP 405-3 via AP 405-2 and AP 405-1, and path 6 (435) connecting the AP 405-5 to AP 405-6 via AP 405-2, AP 405-1, and AP 405-4. The transit time for path 4 (425) may be the same as that for path 1 (410), including a termination delay at AP 405-5 (or AP 405-1) and a hop-delay at AP 405-2. The transit time for path 5 (430) may include a termination delay at AP 405-5 (or AP 405-3), with hop-delays at AP 405-2 and AP 405-1. The transit time for path 6 (435) may include a termination delay at AP 405-5 (or AP 405-6), with hop-delays at AP 405-2, AP 405-2, and AP 405-4.

Within the CG, AP 405-6 may estimate the following three paths as depicted in FIG. 4C: path 7 (440) connecting the AP 405-6 to AP 405-1 via AP 405-4, path 8 (445) connecting the AP 405-6 to AP 405-3 via AP 405-4 and AP 405-1, and path 9 (450) connecting the AP 405-6 to AP 405-5 via AP 405-4, AP 405-1, and AP 405-2. The transit time for path 7 (440) may include a termination delay at AP 405-6 (or AP 405-1) and a hop-delay at AP 405-4. The transit time for path 8 (445) may include a termination delay at AP 405-6 (or AP 405-3), with hop-delays at AP 405-4 and AP 405-1. The transit time for path 9 (450) may be the same as that for path 6 (435), including a termination delay at AP 405-6 (or AP 405-5), with hop-delays at AP 405-4, AP 405-1, and AP 405-2.

In some embodiments, the total number of paths may be represented by N×N×P, where "P" represents additional factors such as redundancy or failover paths that need to be considered in more complex network topologies. As a simplification, the CG operation may be limited to an L2 broadcast domain (whether it is a wired LAN or Wi-Fi), in which embodiment the N×N×P may be simplified to N×1×2. This simplification assumes that a broadcast domain (BCAST) is representative of any link, which may not be strictly accurate for a virtual LAN (VLAN), where broadcast domains may be segmented and not all links are universally accessible.

In the decentralized MAPC setup, each AP in the CG, such as AP 405-1, AP 405-3, AP 405-5, and AP 405-6, may actively participate in path estimation and calculate the corresponding transit time for each path. After these calculations, in some embodiments, each AP may report the transit times to an AP assigned for transport mode selection. The assigned AP may aggregate the calculated times from all APs in the CG, evaluate the relevant transit times for wireless paths, and check the MAPC mode in use. Based on these factors, the assigned AP may then determine the most suitable transport mode (or the transport mode that offers an improved performance) for the CG for multi-AP coordination.

In the network depicted in FIGS. 4A-4C, where wired connections reach each AP in the CG (including AP 405-1, AP 405-3, AP 405-5, and AP 405-6), wired connections may be preferred when the CG operates under C-TDMA mode. However, as discussed above, the system may switch to wireless mode if the hop-delays are significant, making the transit time for certain paths, such as path 2 (415), much shorter than that for other paths, such as paths 1, 3, and 4-9. When C-SR mode is in use, wireless mode may be selected for their speed and flexibility, but if the calculation reveals that wired paths offer significantly faster transmission than wireless paths (e.g., potentially due to factors like congestion or interference in the wireless network), the system may switch to wired mode for maintaining efficient coordination within the CG.

In some embodiments, a software-defined-networking (SDN)-based controller (e.g., a Catalyst Center) may be established. The SDN-based controller may operate at the IP layers, which allows it to centralize transport mode selection across the entire network, including multiple CGs. In some embodiments, the SDN-based controller may collect transport capability data from all APs across the network. For example, in the depicted network setup, assuming that CG 1 is formed to include AP 405-1, AP 405-3, AP 405-5, and AP 405-6, and CG 2 is formed to include AP 405-2 and AP 405-4, the controller may perform calculations for all paths within each CG (whether 1×N or N×N) and determine the most suitable transport mode (or the transport mode that offers an improved performance) for each CG. In some embodiments, each AP may conduct its own path estimation and transit time calculation, then report these results to the SDN-based controller. The controller may aggregate the data and determine the transport mode for each CG.

The network setup as depicted in FIGS. 3 and 4A-4C, which includes six APs wired to each other with a CG formed between AP 405-1, AP 405-3, AP 405-5, and AP 405-6, is provided for conceptual clarity. In some embodiments, any number of APs may be presented within the network, and the APs may be connected either through wired connections, wireless connections, or a combination of both.

Figure 5:
FIG. 5 depicts an example method for a leader AP deciding transport mode for a CG, according to some embodiments of the present disclosure.

FIG. 5 depicts an example method 500 for a leader AP deciding transport mode for a CG, according to some embodiments of the present disclosure. In some embodiments, the leader AP may correspond to AP 105-1 of FIG. 1C, RAP 135 of FIG. 1C, AP/WLC 210 of FIG. 2, or AP 305-1 of FIG. 3. In some embodiments, the example method 500 may be performed by a WLC, such as WLC 120 as depicted in FIG. 1B.

At block 505, a leader AP (or WLC) initializes its settings within a CG after being selected as the leader. In some embodiments, the initialization may include setting up the required configurations and defining its responsibility for coordinating communication between the APs in the CG.

At block 510, the leader AP (or WLC) receives capability information from the other APs in the CG. In some embodiments, the capability information may include details such as each AP's capability to act as a transport port in wired connections and its role or location within the network (e.g., relay or endpoint). In some embodiments, the capability information may be sent through beacon or probe response frames. By processing the received information, the leader AP (or WLC) may develop a comprehensive understanding of the network's topology, each AP's capability, and its potential roles in the MAPC communication. This information may later be used to estimate wired paths, calculate transit times (or delays), and select the appropriate transport mode for the CG.

At block 515, the leader AP (or WLC) verifies whether every AP in the CG has provided the required data, such as its transport capability, role, and other performance metrics. If capability information has been received from all other APs in the CG, the method 500 proceeds to block 520. If some APs have not yet sent their capability information, the method 500 returns to block 510, where the leader AP (or WLC) may wait for the remaining data to arrive. In some embodiments, the leader AP (or WLC) may send additional requests to the APs to collect their capability data.

At block 520, the leader AP (or WLC) discovers wired paths and calculates or estimates the transit time (or delay) for each path. In some embodiments, the leader AP (or WLC) may use protocols such as Internet Control Message Protocol (e.g., traceroute) or Address Resolution Protocol to identify the available wired routes. Since the CG has a leader AP (or WLC) configured to coordinate data transmission, only the paths from the leader AP (or WLC) to each of the participating APs (also be referred to in some embodiments as peer APs) need to be estimated, resulting in a total of 1×N wired paths (where "1" represents the leader AP, and "N" represents the number of participating APs in the CG). Once the wired paths are identified, the leader AP (or WLC) calculates the transit time (or delay) for each path, considering factors like hop-delays and termination delays. As used herein, the transit time (or delay) for a wired path may include the time for a signal to travel over cables between APs and the time that the signal is processed at the endpoint for multi-AP coordination. These transit times may then be used to assess the suitability of the wired paths for MAPC communication and coordination within the CG.

At block 525, the leader AP (or WLC) evaluates wireless paths between itself and other APs in the CG. In some embodiments, the speed and reliability of wireless transmission may be affected by metrics like signal strength, traffic load, or the level of interference from other devices. By considering these factors, the leader AP (or WLC) calculates the overall transit time (or delay) for each wireless path. As used herein, the transit time (or delay) for a wireless path may refer to the time for a signal to travel over the air between APs and the time that the signal is processed at the endpoint for multi-AP coordination.

At block 530, the leader AP (or WLC) assesses the MAPC mode (e.g., C-TDMA, C-SR, or other modes) being used by the CG and determines the respective requirements for speed, synchronization, and/or reliability.

At block 535, the leader AP (or WLC) selects the suitable transport mode (wired or wireless) for multi-AP coordination. In some embodiments, the leader AP (or WLC) may compare the transit times for both wired and wireless paths. If the wired paths offer lower transit times, lower packet loss rates, and higher reliability, wired transport mode may be selected. Additionally, the specific MAPC mode in use may also influence the transport mode selection. For example, when C-TDMA mode is in use, which requires low latency, low packet loss, and high reliability, wired paths may be preferred to maintain precise timing and synchronization. If CG is operating under C-SR mode, which prioritizes speed and flexibility over reliability, wireless paths may be selected, even if the transit times are slightly higher than that for wired paths. Furthermore, the leader AP (or WLC) may adjust the transport mode based on real-time changes in network conditions. For example, if wireless transport mode is initially selected for a CG operating under C-SR mode, but the leader AP (or WLC) detects a significant increase in network congestion and interference (e.g., increased packet loss rate) or reduced signal strength, the leader AP (or WLC) may switch to wired connections to maintain stable and efficient MAPC communication.

At block 540, the leader AP (or WLC) communicates the selected transport mode to all participating APs in the CG. In some embodiments, the selected transport mode may be sent through beacon or probe response frames.

At block 545, the leader AP (or WLC) performs centralized multi-AP coordination using the selected transport mode. If wired mode is selected, the leader AP (or WLC) may send and receive MAPC messages through the wired cables. The messages may include data transmission requests (e.g., 230 of FIG. 2) received from participating APs and instructions (e.g., 235 of FIG. 2) to the APs for timing synchronization and data transmission. If wireless mode is selected, the leader AP (or WLC) may use wireless connections (e.g., Wi-Fi links) to coordinate MAPC communication. The leader AP (or WLC) may broadcast and receive MAPC messages over the air.

Figure 6:
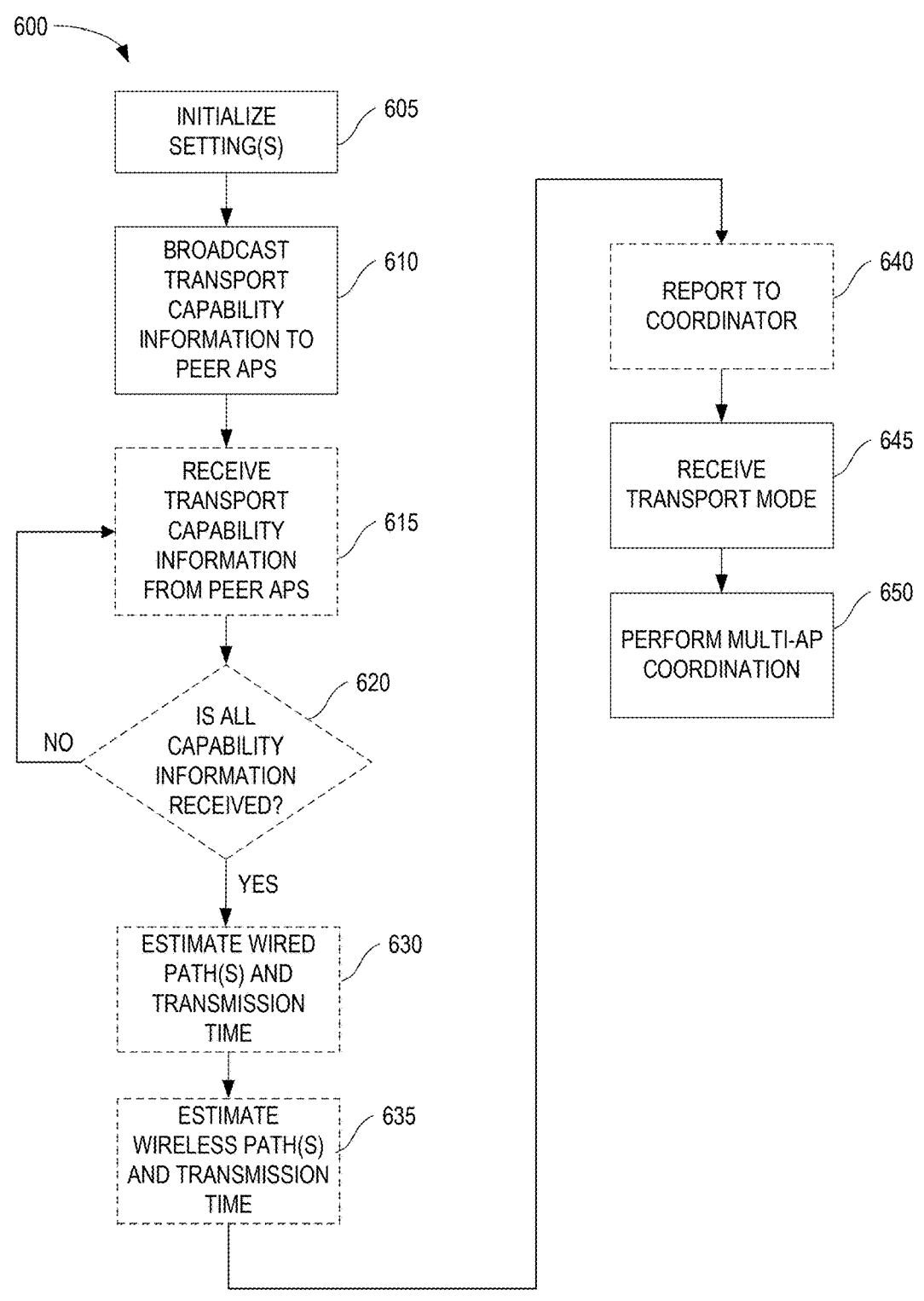
FIG. 6 depicts an example method for a participating AP estimating path and transit time for transport mode selection, according to some embodiments of the present disclosure.

FIG. 6 depicts an example method 600 for a participating AP estimating path and transit time for transport mode selection, according to some embodiments of the present disclosure. In some embodiments, the participating AP may correspond to APs 105-2 or 105-3 of FIG. 1A, APs 105 of FIG. 1B, MAP 130 of FIG. 1C, AP 205 of FIG. 2, APs 305-2, 305-3, 305-4, 305-5, or 305-6 of FIG. 3, or AP 405 of FIG. 4.

At block 605, a participating AP (also referred to in some embodiments as a peer AP) initialize its settings and prepares to communicate with other APs in the CG.

As used herein, the participating AP in a centralized MAPC configuration refers to an AP that relies on a leader AP or WLC (e.g., 105-1 of FIG. 1A or 120 of FIG. 1B) to coordinate data transmission using a shared channel. The participating AP may send requests to the leader AP (or WLC), indicating its need for coordination, and the leader AP (or WLC) may respond with instructions for timing synchronization and data transmission. As used herein, the participating AP in a decentralized MAPC setup refers to any AP in the CG. The participating AP communicates directly with other APs in the CG for coordination and data transmission, without depending on a centralized leader AP (or WLC).

At block 610, the participating AP broadcasts its transport capability information to other APs in the CG, including its ability to act as a transport node in wired connections, and its role in the network (e.g., relay or endpoint).

At block 615, the participating AP listens for and receives transport capability information from other APs in the same CG.

At block 620, the participating AP checks if it has received capability information from every other AP in the CG. If any data is missing, the method 600 returns to block 615, where the participating AP may either wait for the remaining data or send additional requests to ensure complete information is gathered.

At block 625, the participating AP estimates the wired paths between itself and every other AP in the CG. In some embodiments, the participating AP may use protocols such as ICMP (e.g., traceroute) or ARP to identify the available wired routes. In a decentralized configuration, each participating AP may directly communicate with every other AP in the CG for data transmission. Therefore, for each participating AP, the paths from that AP to every other AP may be estimated, resulting in a total of 1×N wired paths (where "1" represents the participating AP, and "N" represents the number of APs in the CG minus 1). Each participating AP may then report the estimated paths to a coordinator, which leads to a total of N×N wired paths being estimated for the entire CG.

Once the paths are determined, the participating AP calculates or estimates the transit time (or delay) for each wired path based on factors like hop-delays and termination-delays.

At block 635, the participating AP evaluates wireless paths by measuring transit times, considering factors such as signal strength, traffic load, and interference levels.

At block 640, the participating AP reports the estimated transit times for both wired and wireless paths to a coordinator. The coordinator may be a central AP or WLC (e.g., 105-1 of FIG. 1A or 120 of FIG. 1B) in a centralized MAPC configuration. In a decentralized MAPC configuration, the coordinator may be any AP (e.g., 405-5 of FIG. 4A) or network device assigned for transport mode selection in the CG. In some embodiments, the coordinator may evaluate the MAPC mode (e.g., C-TDMA or C-SR) in use within the CG and analyze the reported transit times. Based on the evaluation, the coordinator may decide the suitable transport mode (wired or wireless) for the CG.

At block 645, the participating AP receives the selected transport mode (wired or wireless) from the coordinator.

At block 650, the participating AP sends and/or receive MAPC messages using the selected transport mode.

In some embodiments, operations at blocks 615-640 may be performed entirely by the coordinator. In such configurations, the participating AP may simply broadcast its capability information to the coordinator, which then performs the N×N wired path estimation, transit time calculation, and/or evaluation of wireless link speed and quality.

In some embodiments, the coordinator may be an SDN-based controller that collects metrics across the entire network that includes multiple CGs. The SND-based controller may operate at the IP layers and be configured to determine the transport mode for each CG within the network.

FIG. 7 is a flow diagram depicting an example method 700 for transport mode selection based on MAPC deployment modes, according to some embodiments of the present disclosure.

At block 705, a network device (e.g., AP/WLC 210 of FIG. 2) receives information from one or more other network devices within a coordination group (CG) (as depicted by step 220 of FIG. 2), where the CG is configured to operate using a Multi-AP Coordination Protocol (MAPC) mode, and the information indicates, for each of the one or more other network devices, a support of acting as a transport node over wired connections and a MAPC transport role within the CG.

At block 710, the network device estimates a wired path (e.g., paths 1-3 of FIG. 3) between the network device and at least one of the one or more other network devices in the CG based on the received information.

At block 715, the network device determines a transit time required for communication over at least one of the wired paths.

At block 720, the network device determines a transit time required for communication over at least one of wireless paths between the network device and at least one of the one or more other network devices in the CG.

At block 725, the network device selects a transport mode for at least one of the one or more other network devices in the CG based on at least one of the transit times for the wired paths, the transit times for the wireless paths, and the MAPC mode.

At block 730, the network device communities the transport mode to at least one of the one or more other network devices in the CG (as depicted by step 225 of FIG. 2).

At block 735, the network device performs a network coordination operation with the one or more other network devices in the CG using the transport mode (as depicted by steps 230-235 of FIG. 2).

In some embodiments, the network device may broadcast, to at least one of the one or more other network devices in the CG, information indicating a support of acting as a transport node over wired connections and a MAPC transport role of the network device within the CG.

In some embodiments, the network device may comprise a leader access point (AP) (e.g., AP/WLC 210 of FIG. 2, AP 305-1 of FIG. 3) in the CG. In some embodiments, the network device may comprise a wireless local area network (LAN) controller (WLC) (e.g., WLC 120 of FIG. 1B, AP/WLC 210 of FIG. 2).

In some embodiments, the network device may comprise a participating access point (AP) (e.g., AP 205 of FIG. 2) in the CG, and the selection of the transport mode further considers at least one of transit times for wired paths between each of the one or more other network devices in the CG (e.g., paths 1-9 of FIGS. 4A-4C), or transit times for wireless paths between each of the one or more other network devices in the CG.

In some embodiments, the network device may transmit the transit times for the wired paths to a central controller, where the central controller collects transit times from one or more other CGs in a network, and receive a second transport mode for the CG determined by the central controller.

In some embodiments, the MAPC transport role may comprise one of a relay or an endpoint within the CG.

In some embodiments, broadcasting the information may be performed using over-the-air (OTA) transmission, and the information may be transmitted in frames comprising at least one of a beacon or a probe response.

In some embodiments, the transit time for communication over at least one of the wired paths is determined based on a termination-delay associated with a termination node and a hop-delay associated with one or more relay nodes.

In some embodiments, the selection of the transport mode may further consider at least one of packet loss for the wired paths and packet loss of the wireless paths.

Figure 8:
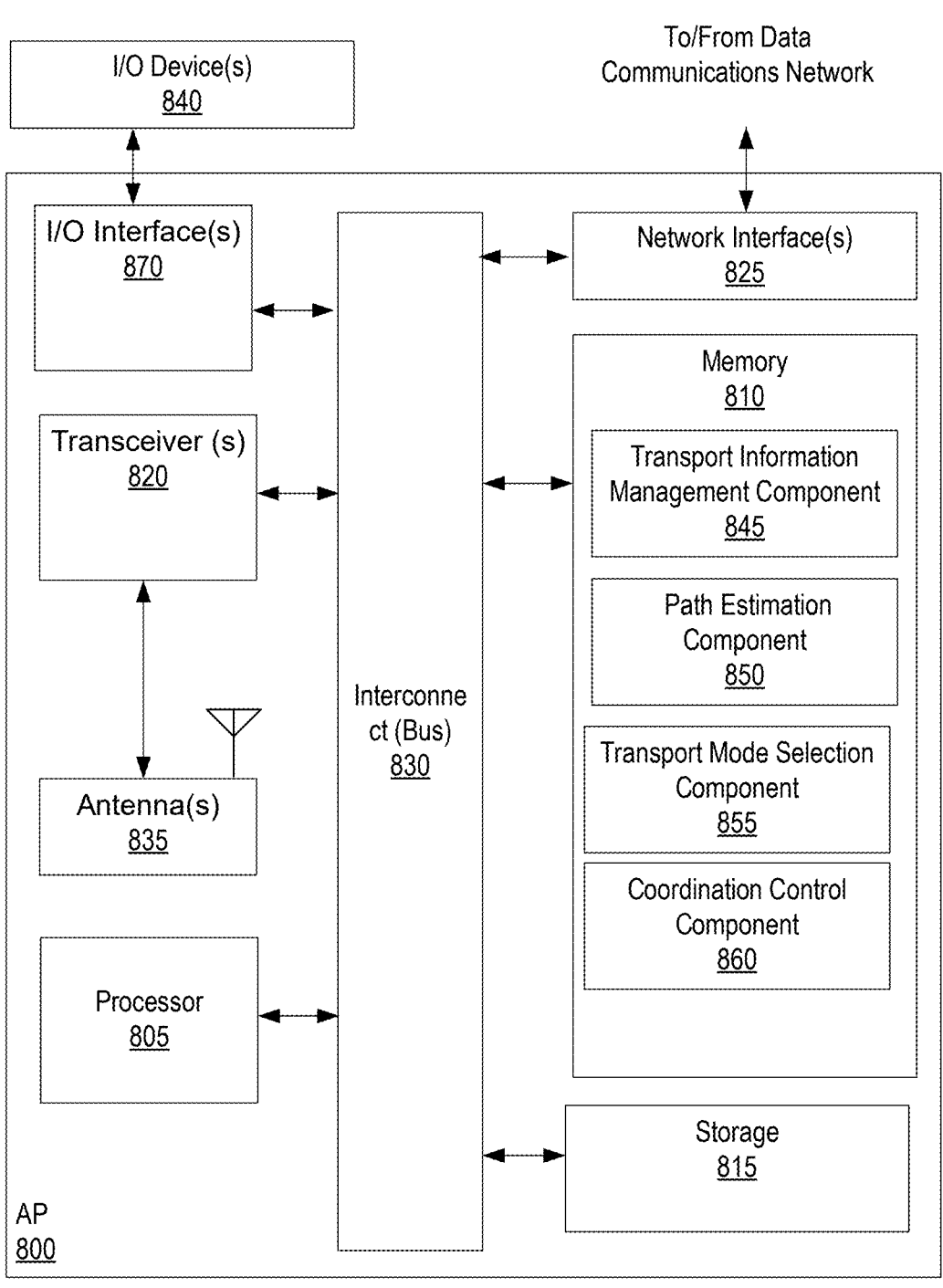
FIG. 8 depicts an example network device configured to perform various aspects of the present disclosure, according to some aspects of the present disclosure.

FIG. 8 depicts an example network device 800 configured to perform various aspects of the present disclosure, according to some aspects of the present disclosure. In some embodiments, the example network device 900 may correspond to a leader AP, such as AP 105-1 as depicted in FIG. 1A, RAP 135 as depicted in FIG. 1C, or AP/WLC 210 as depicted in FIG. 2, or AP 305-1 as depicted in FIG. 3. In some embodiments, the example network device 900 may correspond to a WLC, such as WLC 120 as despite in FIG. 1B, or AP/WLC 210 as depicted in FIG. 2. In some embodiments, the example network device 900 may correspond to a participating AP, such as AP 105-2 or 105-3 as depicted in FIG. 1A, AP 105 as depicted in FIG. 1B, MAP 130 as depicted in FIG. 1C, AP 205 as depicted in FIG. 2, AP 305-2, 305-3, 305-4, 305-5, or 305-6 as depicted in FIG. 3, or AP 405 as depicted in FIGS. 4A-4C.

As illustrated, the example network device 800 includes a processor 805, memory 810, storage 815, one or more transceivers 820, one or more I/O interfaces 880, and one or more network interfaces 825. In some embodiments, I/O devices 840 are connected via the I/O interface(s) 880. Further, via the network interface 825, the network device 800 can be communicatively coupled with one or more other devices and components (e.g., via a network, which may include the Internet, local network(s), and the like). Each of the components is communicatively coupled by one or more buses 830. In some embodiments, one or more antennas 835 may be coupled to the transceivers 820 for transmitting and receiving wireless signals.

The processor 805 is generally representative of a single central processing unit (CPU) and/or graphic processing unit (GPU), multiple CPUs and/or GPUs, a microcontroller, an application-specific integrated circuit (ASIC), or a programmable logic device (PLD), among others. The processor 805 processes information received through the transceiver 820, I/O interfaces 880, and the network interfaces 825. The processor 805 retrieves and executes programming instructions stored in memory 810, as well as stores and retrieves application data residing in storage 815.

The storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN). The storage 815 may store a variety of data for the efficient functioning of the system.

The memory 810 may include random access memory (RAM) and read-only memory (ROM). The memory 810 may store processor-executable software code containing instructions that, when executed by the processor 805, enable the network device 800 to perform various functions described herein for wireless communication. In the illustrated example, the memory 810 includes four software components: the transport information management component 845, the path estimation component 850, the transport mode selection component 855, and the coordination control component 860.

In one embodiment, the transport information management component 845 may broadcast the device's 800 transport capability (e.g., wired support) and transport role within the network (e.g., relay or endpoint) to other APs or WLCs, and receive transport information from other APs. In some embodiments, the transport information management component 845 may be part of a messaging and communication component that handles network discovery and coordination communication using specific frames like beacons, probe responses, or customized MAPC frames.

In one embodiment, the path estimation component 850 may perform path estimation and link analysis for both wired and wireless networks. Based on the received transport information, the path estimation component 850 may discover wired paths between the device 800 and other APs in the CG (e.g., using protocols like ICMP or ARP). Once wired paths are determined, the path estimation component 850 may calculate transit times for these paths based on hop-delays and termination-delays. When wireless links are available, the path estimation component 850 may measure wireless path metrics (e.g., signal strength, traffic load, and interference levels) and estimate the speed and reliability of wireless transmission.

In one embodiment, the transport mode selection component 855 may select the appropriate transport mode (wired or wireless) based on the estimated path performance and the MAPC mode in use. In one embodiment, the coordination control component 860 may manage multi-AP coordination, interacting with other APs in the CG using the selected transport mode.

Although depicted as a discrete component for conceptual clarity, in some embodiments, the operations of the depicted components (and others not illustrated) may be combined or distributed across any number of components. Further, although depicted as software residing in memory 910, in some aspects, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

receiving, by a network device, information from one or more other network devices within a coordination group (CG), wherein the CG is configured to operate using a Multi-AP Coordination Protocol (MAPC) mode, and wherein the information indicates, for each of the one or more other network devices, a support of acting as a transport node over wired connections and a MAPC transport role within the CG;

estimating, by the network device, a wired path between the network device and at least one of the one or more other network devices in the CG based on the received information;

determining, by the network device, a transit time required for communication over at least one of the wired paths;

determining, by the network device, a transit time required for communication over at least one of wireless paths between the network device and at least one of the one or more other network devices in the CG;

selecting, by the network device, a transport mode for at least one of the one or more other network devices in the CG based on at least one of the transit times for the wired paths, the transit times for the wireless paths, and the MAPC mode;

communicating, by the network device, the transport mode to at least one of the one or more other network devices in the CG; and performing, by the network device, a network coordination operation with the one or more other network devices in the CG using the transport mode.

2. The method of claim 1, further comprising broadcasting, by the network device to at least one of the one or more other network devices in the CG, information indicating a support of acting as a transport node over wired connections and a MAPC transport role of the network device within the CG.

3. The method of claim 1, wherein the network device comprises a leader access point (AP) in the CG.

4. The method of claim 1, wherein the network device comprises a participating access point (AP) in the CG, and wherein the selection of the transport mode further considers at least one of transit times for wired paths between each of the one or more other network devices in the CG, or transit times for wireless paths between each of the one or more other network devices in the CG.

5. The method of claim 1, wherein the network device comprises a wireless local area network (LAN) controller (WLC).

6. The method of claim 1, further comprising:

transmitting, by the network device, the transit times for the wired paths to a central controller, wherein the central controller collects transit times from one or more other CGs in a network; and receiving, by the network device, a second transport mode for the CG determined by the central controller.

7. The method of claim 1, wherein the MAPC transport role comprises one of a relay or an endpoint within the CG.

8. The method of claim 2, wherein broadcasting the information is performed using over-the-air (OTA) transmission, and the information is transmitted in frames comprising at least one of a beacon or a probe response.

9. The method of claim 1, wherein the transit time for communication over at least one of the wired paths is determined based on a termination-delay associated with a termination node and a hop-delay associated with one or more relay nodes.

10. The method of claim 1, wherein the selection of the transport mode further considers at least one of packet loss for the wired paths and packet loss of the wireless paths.

11. A system of a network device in a wireless network, comprising:

one or more memories collectively containing one or more programs;

one or more processors, wherein the one or more processors are configured to, individually or collectively, perform an operation comprising:

receiving, by a network device, information from one or more other network devices within a coordination group (CG), wherein the CG is configured to operate using a Multi-AP Coordination Protocol (MAPC) mode, and wherein the information indicates, for each of the one or more other network devices, a support of acting as a transport node over wired connections and a MAPC transport role within the CG;

estimating, by the network device, a wired path between the network device and at least one of the one or more other network devices in the CG based on the received information;

determining, by the network device, a transit time required for communication over at least one of the wired paths;

determining, by the network device, a transit time required for communication over at least one of wireless paths between the network device and at least one of the one or more other network devices in the CG;

selecting, by the network device, a transport mode for at least one of the one or more other network devices in the CG based on at least one of the transit times for the wired paths, the transit times for the wireless paths, and the MAPC mode;

communicating, by the network device, the transport mode to at least one of the one or more other network devices in the CG; and performing, by the network device, a network coordination operation with the one or more other network devices in the CG using the transport mode.

12. The system of claim 11, wherein the operation further comprises broadcasting, by the network device to at least one of the one or more other network devices in the CG, information indicating a support of acting as a transport node over wired connections and a MAPC transport role of the network device within the CG.

13. The system of claim 11, the network device comprises a participating access point (AP) in the CG, and wherein the selection of the transport mode further considers at least one of transit times for wired paths between each of the one or more other network devices in the CG, and transit times for wireless paths between each of the one or more other network devices in the CG.

14. The system of claim 11, wherein the network device comprises a wireless local area network (LAN) controller (WLC).

15. The system of claim 11, wherein the operation further comprises:

transmitting, by the network device, the transit times for the wired paths to a central controller, wherein the central controller collects transit times from one or more other CGs in a network; and receiving, by the network device, a second transport mode for the CG determined by the central controller.

16. The system of claim 11, wherein the MAPC transport role comprises one of a relay or an endpoint within the CG.

17. The system of claim 12, wherein broadcasting the information is performed using over-the-air (OTA) transmission, and the information is transmitted in frames comprising at least one of a beacon or a probe response.

18. The system of claim 11, wherein the transit time for communication over at least one of the wired paths is determined based on a termination-delay associated with a termination node and a hop-delay associated with one or more relay nodes.

19. The system of claim 11, wherein the selection of the transport mode further considers at least one of packet loss for the wired paths and packet loss of the wireless paths.

20. One or more non-transitory computer-readable media containing, in any combination, computer program code that, when executed by a computer system, performs an operation comprising:

receiving, by a network device, information from one or more other network devices within a coordination group (CG), wherein the CG is configured to operate using a Multi-AP Coordination Protocol (MAPC) mode, and wherein the information indicates, for each of the one or more other network devices, a support of acting as a transport node over wired connections and a MAPC transport role within the CG;

estimating, by the network device, a wired path between the network device and at least one of the one or more other network devices in the CG based on the received information;

determining, by the network device, a transit time required for communication over at least one of the wired paths;

determining, by the network device, a transit time required for communication over at least one of wireless paths between the network device and at least one of the one or more other network devices in the CG;

selecting, by the network device, a transport mode for at least one of the one or more other network devices in the CG based on at least one of the transit times for the wired paths, the transit times for the wireless paths, and the MAPC mode;

communicating, by the network device, the transport mode to at least one of the one or more other network devices in the CG; and performing, by the network device, a network coordination operation with the one or more other network devices in the CG using the transport mode.

* * * * *